United States Patent [19]

Fogel et al.

[11] 4,011,671
[45] Mar. 15, 1977

[54] PROGRESSIVE WEIGHT CHART

[76] Inventors: Danny L. Fogel, 160 N. Shores Drive, Solana Beach, Calif. 92075; Leonard M. Luttbeg, 2828 Upshur St., San Diego, Calif. 92106

[22] Filed: Feb. 10, 1975

[21] Appl. No.: 548,826

[52] U.S. Cl. .................................................. 35/7 R
[51] Int. Cl.² ........................................... G09B 29/00
[58] Field of Search ......... 35/7 A, 7 R, 22 R, 23 R, 35/24 R, 29 R, 7; 40/142 A

[56] References Cited
UNITED STATES PATENTS

| | | | |
|---|---|---|---|
| 2,965,978 | 12/1960 | Olson | 35/23 R |
| 3,186,323 | 6/1965 | Nichaus | 35/7 A X |
| 3,460,281 | 8/1969 | Levy | 35/7 R X |
| 3,514,873 | 6/1970 | Stobbe | 35/7 A X |
| 3,827,168 | 8/1974 | Mori | 35/7 A X |

Primary Examiner—Louis G. Mancene
Assistant Examiner—John H. Wolff

[57] ABSTRACT

A progressive weight chart in which weight is graphically displayed on a day to day basis with a weight scale on one axis and a time scale on another axis graduated in convenient increments, together with incentive indicia on the same axis as the weight scale on an opposite side of the chart which indicates a change of weight categories.

1 Claim, 3 Drawing Figures

U.S. Patent     Mar. 15, 1977     4,011,671
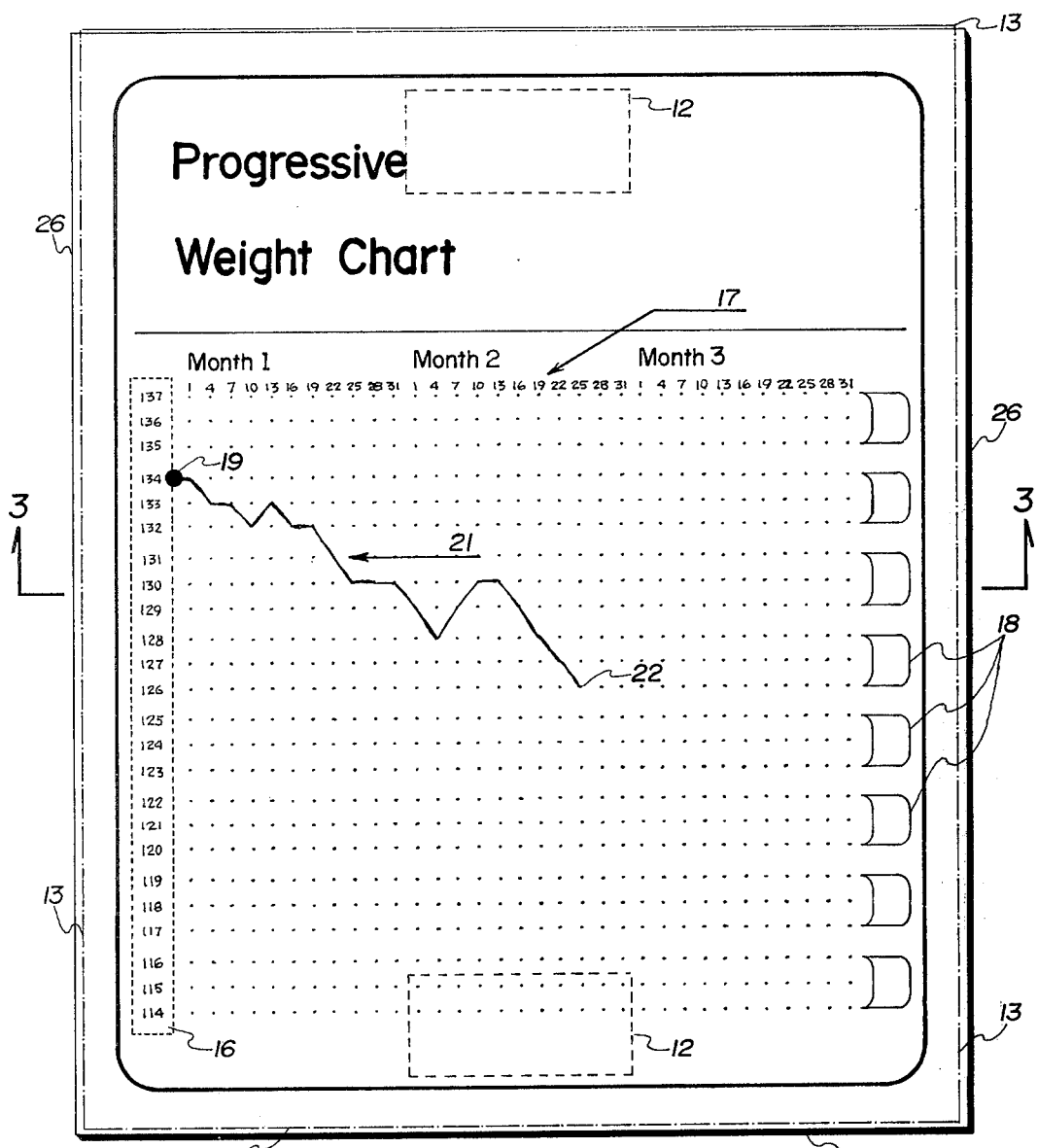
Fig. 1
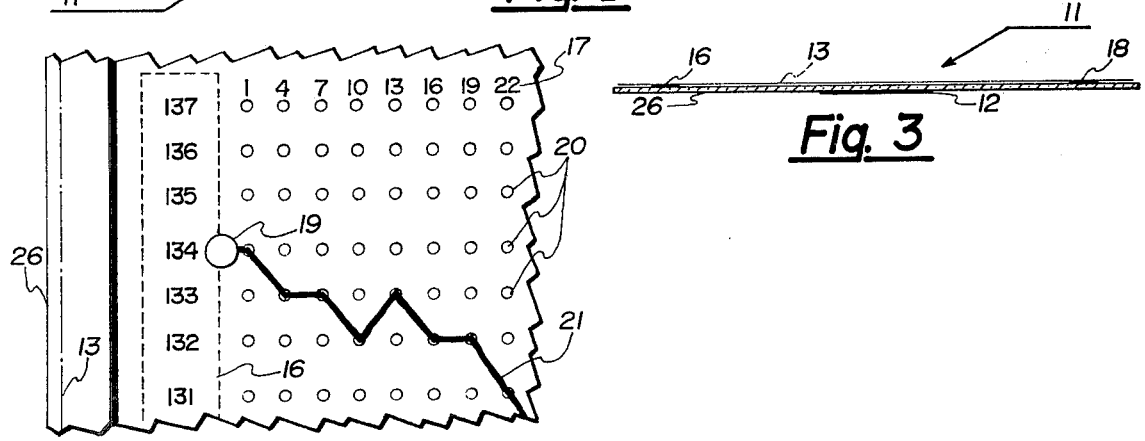
Fig. 2
Fig. 3

PROGRESSIVE WEIGHT CHART

BRIEF DESCRIPTION OF THE INVENTION

The present invention relates to a progressive weight chart and more particularly to a progressive weight chart which graphically displays weight against time.

According to the invention, a progressive weight chart is provided having a removable weight scale on one axis, preferably the vertical axis thereof, in which the user can choose the range of weight applicable, and a time scale at right angles to the weight scale, i.e., on the other axis, preferably the horizontal axis, which depicts the time in days. The user then, after selecting the weight range applicable to him, weighs himself and places a starting dot on the weight scale corresponding to his weight on the first day. Each subsequent day or every three days, etc., he extends a line from the starting dot to the crossing of the two axes, i.e., the weight axes and the time axes, proceeding until the desired weight is reached. A plurality of incentive indicia is placed on the opposite side of the weight scale indicating various categories of weight which can be plasticized or alternatively, a plastic overlay can be attached to the weight chart for utilization of a grease pencil or crayon, etc., to complete the graph. The chart can be magnetically mounted by attaching magnetic strips to the back surface thereof or any other form of desired mounting can be utilized.

An object of the present invention is the provision of an improved progressive weight chart.

Another object of the invention is the provision of a weight chart which has a removable weight scale for selection of weight range.

Yet another object of the invention is the provision of a progressive weight chart with incentive indicia opposite the weight scale.

Yet another object of the invention is the provision of a progressive weight chart which is inexpensive to manufacture and extremely convenient in use.

Other objects and many of the attendant advantages of the present invention will be readily appreciated as the same becomes better understood by reference to the following detailed description when considered in connection with the accompanying drawing in which like reference numerals designate like parts throughout the Figures thereof and wherein:

FIG. 1 is a top view of the preferred embodiment of the present invention:

FIG. 2 is a view of a section of the embodiment of FIG. 1 enlarged for clarity; and FIG. 3 is a sectional view taken along lines 3 — 3 of FIG. 1.

DETAILED DESCRIPTION OF THE DRAWING

Referring to FIG. 1, a progressive weight chart is shown generally at 11 having a pair of magnetic sections attached to the back thereof illustrated in dotted lines at 12 with a transparent plastic overlay 13. Weight chart 11 has a border 14 with a vertical weight scale strip 16 and a time scale 17 at right angles thereto. A plurality of incentive indicia markers are shown at 18 opposite weight scale 16. Starting dot marker 19 is shown disposed toward the top of weight scale 16. A progress curve 21 is shown extending between starting marker dot 19 and an ending point 22.

Referring to FIG. 2, progressive weight chart 11 is shown with plastic overlay 13 and a portion of weight scale 16. A portion of time scale 17 is shown at the top portion thereof with a plurality of graph dots 20 corresponding with each division of weight scale 16 and time scale 17. Starting marker dot 19 is shown adjacent one edge of weight scale 16 with a graph curve 21 extending therefrom.

Referring to FIG. 3, progressive weight chart 11 is shown having a board 26 which can be fabricated of any desired material such as plastic, cardboard, etc., with a magnetic section 12 attached to the back thereof and a weight scale 16 applied to the front surface thereof with indicia marker 18 attached to the surface opposite weight scale 16. Plastic overlay 13 covers the top portion of board 26 and weight scale 16 and indicia marker 18.

OPERATION

Referring back to all of the figures, weight strips 16 are supplied in kit form together with incentive indicia 18. If the user desires to lose weight, he would select a weight strip having his current weight toward the top portion thereof as shown in FIG. 1. If the user desires to gain weight he would choose a weight range with his current weight at the bottom portion thereof. After selecting his range, he then places the weight scale on the face of the chart 11 (the weight scale having a gummed back surface), he then carefully checks his weight and places starting marker dot 19 (which is also gummed), at the appropriate numerical weight on weight scale 16. The psychological or incentive indicia 18 are set in place as indicated in FIG. 1, again with gummed back surfaces. It is contemplated that these will carry messages such as heavy, obese, grotesque, trim, keep going, great, irresistible, etc., and cover a range of weight; for example three pounds each, to indicate a movement from one category to another. In this regard, it is pointed out that the weight scale is spaced in groups of three to accommodate the different categories with a greater vertical displacement between each adjacent category resulting in a psychological lift when the user moves from one category to another, i.e., the vertical displacement of curve 21 will be greater than movement within each category. A pen, crayon or grease pencil can be conveniently attached to the weight chart as by Velcro patch, magnetic coupling, etc. Magnetic sections 12 implement a convenient attachment to a metallic object such as a refrigerator.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

The invention claimed is:
1. A progressive weight chart comprising:
a flat board member constituting the surface on which successive weight changes may be plotted, said member having a generally rectangular configuration;
a vertical weight scale disposed along one border of said member in proximity to the first edge thereof and forming one axis of said chart, successive numbers of said scale being grouped in groups of at least two numbers, each group being spaced from the next succeeding group by a greater vertical displacement than the vertical displacement between two adjacent numbers within each group;

a time scale disposed at right angles to said weight scale adjacent to another border of said chart and forming a second axis of said chart; and a plurality of incentive indicia disposed along the border in proximity with that edge of said board member opposite to said first edge, each of said incentive indicia extending along a distinct weight range corresponding to one of said groups; said incentive indicia being correlated with said groups of numbers of said weight scale so as to reflect the progressive weight changes plotted on said chart and any psychological affect thereof.

* * * * *